(12) United States Patent
Reid et al.

(10) Patent No.: US 12,017,159 B2
(45) Date of Patent: Jun. 25, 2024

(54) FEEDWELL FOR AN INCLINED PLATE SEPARATOR

(71) Applicant: SYNCRUDE CANADA LTD. in trust for the owners of the Syncrude Project as such owners exist now and in the future, Calgary (CA)

(72) Inventors: Kevin Reid, Edmonton (CA); Jonathan Spence, Edmonton (CA); Parinaz Makhtoumi, Edmonton (CA); Trevor Hilderman, Port Coquitlam (CA); Konstantin Pougatch, Port Moody (CA)

(73) Assignee: Syncrude Canada Ltd., Calgary (CA), in trust for the owners of the Syncrude Project as such owners exist now and in the future ( * ) Notice: Subject to any disclaimer, the term of this patent is extended or adjusted under 35 U.S.C. 154(b) by 0 days.

(21) Appl. No.: 17/946,321

(22) Filed: Sep. 16, 2022

(65) Prior Publication Data
US 2024/0091674 A1    Mar. 21, 2024

(51) Int. Cl.
*B01D 21/00*     (2006.01)
*B01D 21/24*     (2006.01)

(52) U.S. Cl.
CPC ..... *B01D 21/0045* (2013.01); *B01D 21/2416* (2013.01)

(58) Field of Classification Search
CPC ................ B01D 21/0045; B01D 21/2416
See application file for complete search history.

(56) References Cited

U.S. PATENT DOCUMENTS

| | | | | |
|---|---|---|---|---|
| 3,552,554 | A * | 1/1971 | Olgard | B01D 21/0051 210/519 |
| 5,397,472 | A * | 3/1995 | Bouchard | B01D 21/0057 210/519 |
| 7,763,166 | B2 | 7/2010 | Cymerman et al. | |
| 2005/0236048 | A1* | 10/2005 | Griepsma | F16B 35/06 137/592 |
| 2007/0044437 | A1* | 3/2007 | Larnholm | B01D 45/16 55/319 |

(Continued)

FOREIGN PATENT DOCUMENTS

CA         2653032        8/2010

*Primary Examiner* — Bradley R Spies
*Assistant Examiner* — Jeannie McDermott
(74) *Attorney, Agent, or Firm* — Knobbe, Martens, Olson & Bear, LLP

(57) ABSTRACT

A feedwell is provided for an inclined plate separator having a separation chamber containing parallel plates defining separation passages. The feedwell includes a plenum defining a plenum chamber external to the separation chamber, an upward-facing deflector surface in the plenum chamber, an inlet for discharging influent fluid onto a receiving region of the deflector surface, and an outlet for discharging the influent fluid out of the plenum and transversely into the separation chamber. The feedwell also includes parallel fins. The fins define between them plenum passages that extend from a fin end to outlet. The fin ends are disposed between the outlet and the receiving region, and are arranged in a horizontal semi-elliptical path defining a center that horizontally coincides with the receiving region.

11 Claims, 13 Drawing Sheets

(56) References Cited

U.S. PATENT DOCUMENTS

| | | | |
|---|---|---|---|
| 2008/0290532 A1* | 11/2008 | Kooijman | B01D 1/305 |
| | | | 261/108 |
| 2011/0079563 A1* | 4/2011 | Triglavcanin | B01D 21/2411 |
| | | | 210/519 |
| 2011/0127198 A1 | 6/2011 | Siy et al. | |
| 2013/0037494 A1* | 2/2013 | Cook | B01D 21/0057 |
| | | | 210/800 |
| 2013/0140249 A1* | 6/2013 | Sury | B01D 21/0045 |
| | | | 210/800 |
| 2013/0284641 A1 | 10/2013 | Siy et al. | |
| 2014/0008293 A1* | 1/2014 | Sury | B01D 21/2411 |
| | | | 210/519 |

* cited by examiner

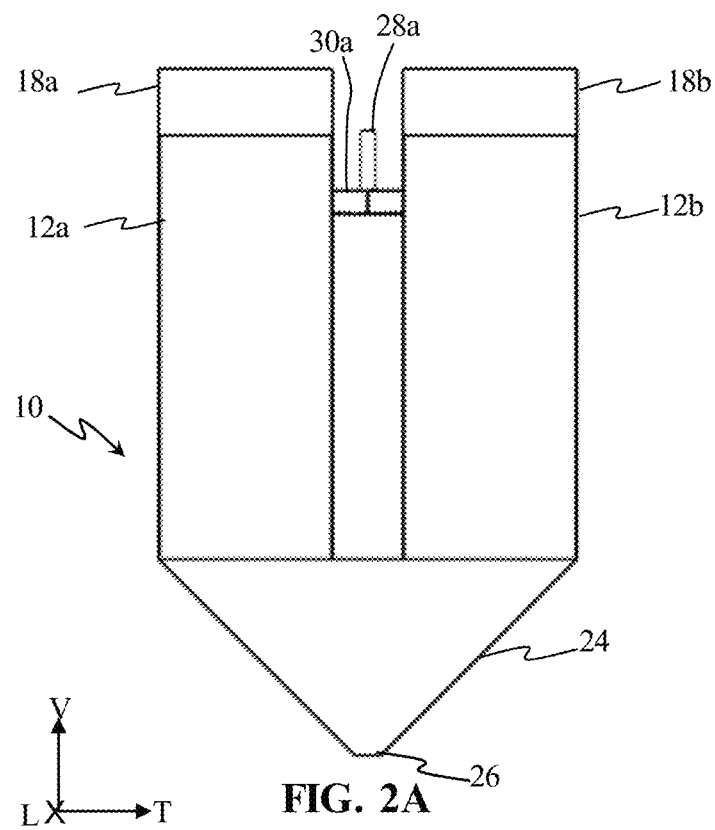
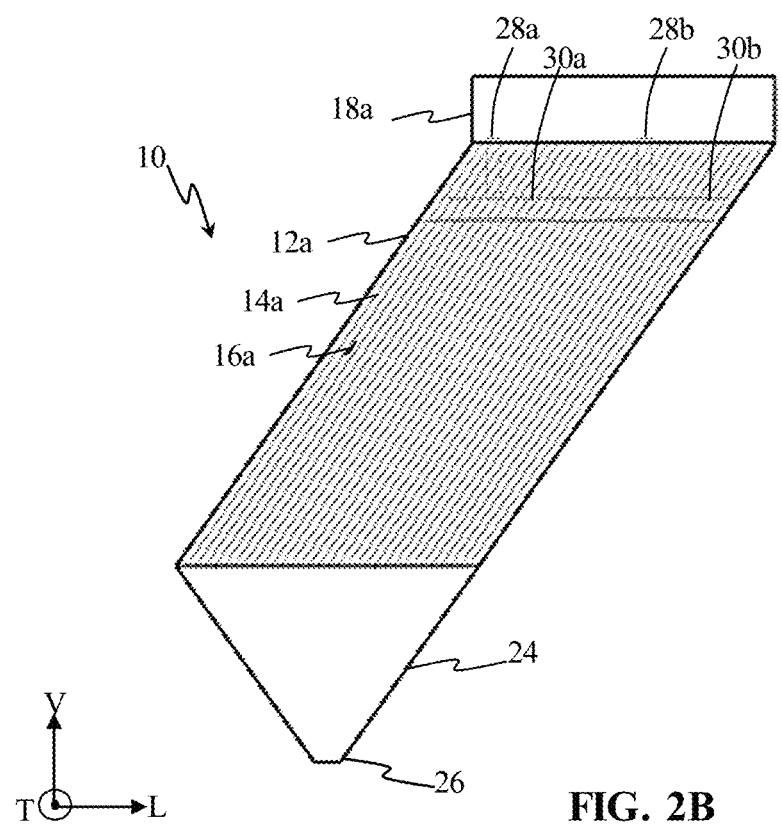

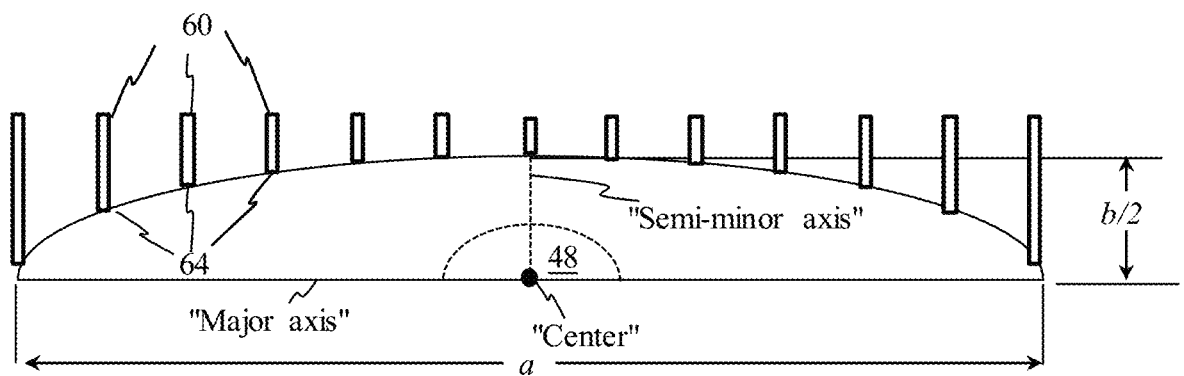
FIG. 5
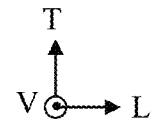
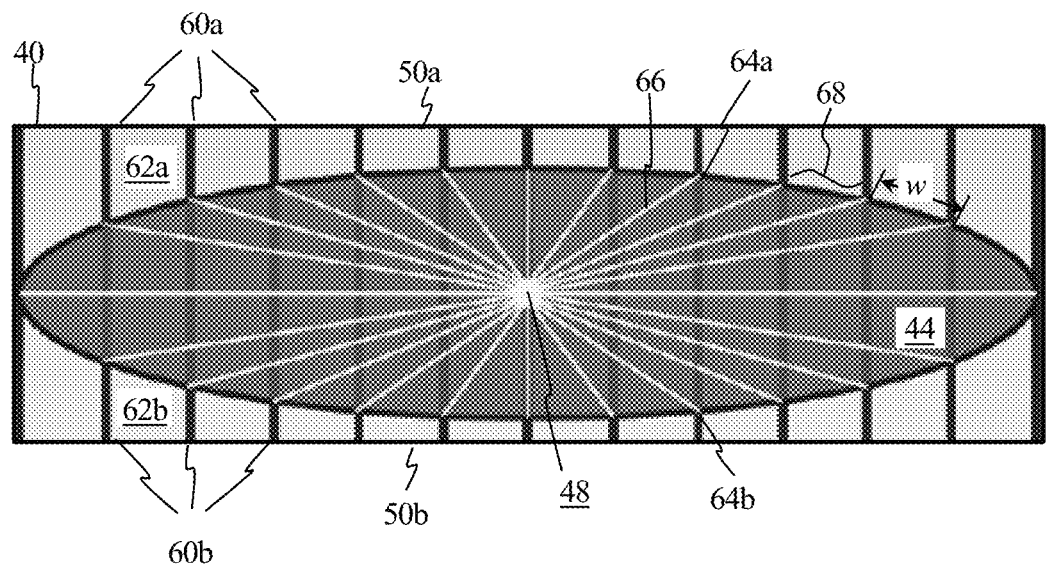
FIG. 6
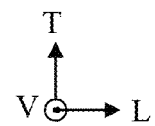

FEEDWELL FOR AN INCLINED PLATE SEPARATOR

TECHNICAL FIELD

The following relates to a feedwell for an inclined plate separator.

BACKGROUND

Oil sand ore from the Athabasca region of Alberta, Canada, comprises water-wet, coarse sand grains having flecks of a viscous hydrocarbon, known as bitumen, trapped between the sand grains. The bitumen in oil sand can be recovered using a water based bitumen extraction process. The mined oil sand ore is mixed with heated process water, naturally entrained air and, optionally, caustic (NaOH) or other secondary process aids (SPA) such as sodium citrate, sodium triphosphate, to form an oil sand slurry. The slurry is conditioned, for example in a tumbler or pipeline, for a prescribed retention time, to initiate a preliminary separation or dispersal of the bitumen and solids and to induce air bubbles to contact and aerate the bitumen. The conditioned slurry is transported to an extraction plant, where the oil sand slurry may be further diluted with flood water and introduced into a large, open-topped, conical-bottomed, cylindrical vessel referred to as a primary separation vessel or "PSV"). The oil sand slurry is retained in the PSV under quiescent conditions for a prescribed retention period. During this period, aerated bitumen rises and forms a froth layer, which overflows the top lip of the vessel and is conveyed away in a launder. The froth is subjected to further froth cleaning, i.e., removal of entrained water and solids, prior to upgrading. Sand grains sink to the conical bottom of the vessel, and leave the bottom of the vessel as a wet tailings stream containing a reduced amount of bitumen.

The PSV may be a "deep cone PSV" having a slope angle in the range of about 55° to 65°. In a commercial scale application, the deep cone PSV may require large dimensions of about 30 meters in diameter, and 25 meters in height. When filled with oil sand slurry, the PSV and its contents may weigh in excess of 20,000 tonnes, and require a robust pile foundation. As such, the PSV is capital intensive to build, and difficult to relocate.

Alternatively, the PSV may be a "shallow cone PSV" with a slope angle in the range of about 20° to 30°, and equipped with an internal rake mechanism that rotates to move the sand grains in the conical bottom toward a central outlet. In comparison with a deep cone PSV, a shallow cone PSV may be made smaller and less capital intensive to build. However, additional maintenance is required for reliable operation of the rake mechanism.

Alternatively, the PSV may be equipped with an internal inclined plate separator. Canadian patent application publication no. CA 2,653,032 (Li; 2010-08-09) discloses a PSV with a set of internal inclined plates that form a circle that envelops a feedwell in the center of the PSV. United States patent application publication no. US 2013/0284641 A1 (Siy et al.; 2013-10-31) discloses a PSV with a plurality of internal inclined plates angled downwardly toward the center of the PSV. The inclined plates may be cone-shaped and nested together, or form an essentially circular inclined plate assembly, with inclined plates that surround a feedwell in the center of the PSV.

In addition to above described use for separation of bitumen froth from the oil sand slurry (i.e., the "extraction stage" of the bitumen extraction process), inclined plate separators may be used in other stages of bitumen extraction process. U.S. Pat. No. 7,763,166 B2 (Cymerman et al.; 2010-07-27) discloses use of inclined plate separators to separate an oil sand slurry into an overflow product (bitumen, fines, and water) and an underflow product, upstream of the extraction stage. US 2011/0127198 A1 (Siy et al.; 2011-06-02) discloses use of inclined plate separators for removing a bitumen rich overflow from coarse-solids as part of a de-sander circuit upstream of the extraction stage. Conical-bottomed cylindrical vessels with internal inclined plates may also be used for separation of water and fine solids from the bitumen froth produced from the PSV in the extraction stage (i.e., the "froth treatment stage" of the bitumen extraction process).

Regardless of application, uniform distribution of the influent fluid among the separation passages between the inclined plates may be important to the efficacy of the inclined plate separator in clarifying the influent fluid of solid particles. Uniform distribution of the influent fluid might be achieved by providing multiple inlet lines, with each inlet line supplying influent fluid in a controller manner to a different separation passage. However, this arrangement may be impractical and complicated for inclined plate settlers having dozens of separation passages. Alternatively, uniform distribution of the feed material may be achieved by providing an orifice plate having openings aligned with the separation passages, as is known in the art. This, however, may not be effective for an oil sand slurry that includes relatively large lumps of ore, clay, or rock having sizes of about 2 to 5 inches (0.051 to 0.127 m). To avoid plugging by these lumps, the orifice plate openings would have to be about 6 to 15 inches (0.152 to 0.381 m) in diameter, which may be too large to effectively influence the hydraulic behavior of the slurry. Therefore, there remains a need for alternative means for distributing an influent fluid among the separation passages of an inclined plate separator, and for improvements in using an inclined plate separator to process oil sand slurries.

SUMMARY

The following relates to an inclined plate separator. It will be understood that the inclined plate separator comprises a separation chamber containing a plurality of internal plates extending parallel to each other in a horizontal transverse direction, vertically inclined relative to a horizontal lateral direction perpendicular to the transverse direction, and spaced apart equidistantly from each other in the lateral direction to define therebetween a plurality of internal separation passages of the inclined plate separator.

In one aspect, a feedwell for supplying an influent fluid to an inclined plate separator is provided. The feedwell comprises a plenum comprising an internal upward-facing deflector surface, and an inlet for directing the influent fluid into the chamber and downwardly on to a receiving region of the deflector surface. The plenum also comprises an outlet for discharging the influent fluid in the transverse direction from the plenum into the separation chamber of the separator; the outlet extends in the lateral direction over the plurality of internal separation passages of separator. The plenum comprises a plurality of internal fins extending parallel to each other in the transverse direction, vertically inclined relative to the lateral direction, and spaced apart equidistantly from each other in the lateral direction to define therebetween a plurality of internal plenum passages each corresponding to a different one of the separation passages of the separator. Each of the fins extends in the transverse direction from a fin proximal end to a fin distal end at the outlet. The fin proximal ends are arranged on a horizontal semi-elliptical path having a center coinciding horizontally with the receiving region of the deflector surface, a major axis extending in the lateral direction, and a semi-minor axis extending in the transverse direction.

In embodiments of the feedwell, the semi-elliptical path may have an eccentricity (e) between about 0.1 to about 0.5, more particularly between about 0.2 to about 0.4, and more particularly about 0.3. The eccentricity is defined by a length (a) of the major axis, and a length (b/2) of the semi-minor axis, in accordance with a relationship $$e = \sqrt{1 - \left(\frac{b}{a}\right)^2}.$$

In embodiments of the feedwell, the deflector surface is contoured, such that the elevation of the deflector surface increases in the transverse direction from the receiving region to the fin proximal ends.

In embodiments of the feedwell, the feedwell further comprises a plurality of internal fin extensions. Each fin extension extends upwardly from the deflector surface, and extends horizontally from a fin extension proximal end at the receiving region to a fin extension distal end abutting a different one of the fin proximal ends.

In embodiments of the feedwell, the plenum is defined in part by an upward facing, lower internal surface disposed below the deflector surface to receive influent fluid flowing off an edge of the deflector surface, and inclined downwardly toward the outlet.

In embodiments of the feedwell, the plenum may be either external or internal to walls that define the separation chamber of the inclined plate separator.

In embodiments of the feedwell, the feedwell is for use with a second inclined plate separator spaced apart in the transverse direction from the first separator. The second separator comprises a second separation chamber containing a second plurality of internal plates extending parallel to each other in the transverse direction, vertically inclined relative to the lateral direction, and spaced apart equidistantly from each other in the lateral direction to define therebetween a second plurality of internal separation passages of the second separator. The plenum further comprises a second outlet, spaced apart from the outlet in the transverse direction, and for discharging the influent fluid in the transverse direction from the plenum into the second separation chamber of the second separator. The second outlet extends in the lateral direction over the second plurality of internal separation passages of the second separator. The plenum further comprises a second plurality of internal fins, spaced apart from the plurality of fins in the transverse direction, extending parallel to each other in the transverse direction, vertically inclined relative to the lateral direction, and spaced apart equidistantly from each other in the lateral direction to define therebetween a second plurality of internal plenum passages each corresponding to a different one of the second separation passages of the second separator. Each of the second fins extends in the transverse direction from a second fin proximal end to a second fin distal end at the second outlet. The second fin proximal ends are arranged on a second horizontal semi-elliptical path having a second center coinciding horizontally with the receiving region of the deflector surface, a second major axis extending in the lateral direction, and a second semi-minor axis extending in the transverse direction.

BRIEF DESCRIPTION OF THE DRAWINGS

In the drawings, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

FIG. 2A shows a transverse elevation view of a second embodiment of an inclined plate separator, including feedwells of the present invention.

FIG. 2B shows a lateral elevation view of the embodiment of the inclined plate separator of FIG. 2A.

FIG. 5 shows, in top plan view, the arrangement of proximal ends of the fins of the feedwell of FIG. 4A as arranged on a semi-elliptical path, for a feedwell.

FIG. 6 shows, in top plan view, a schematic depiction of the flow distribution of influent fluid in an embodiment of a feedwell.

DETAILED DESCRIPTION

An inclined plate separator is provided. Any term or expression not expressly defined herein shall have its commonly accepted definition understood by a person skilled in the art.

Inclined Plate Separator: First Embodiment

Figure 1A:
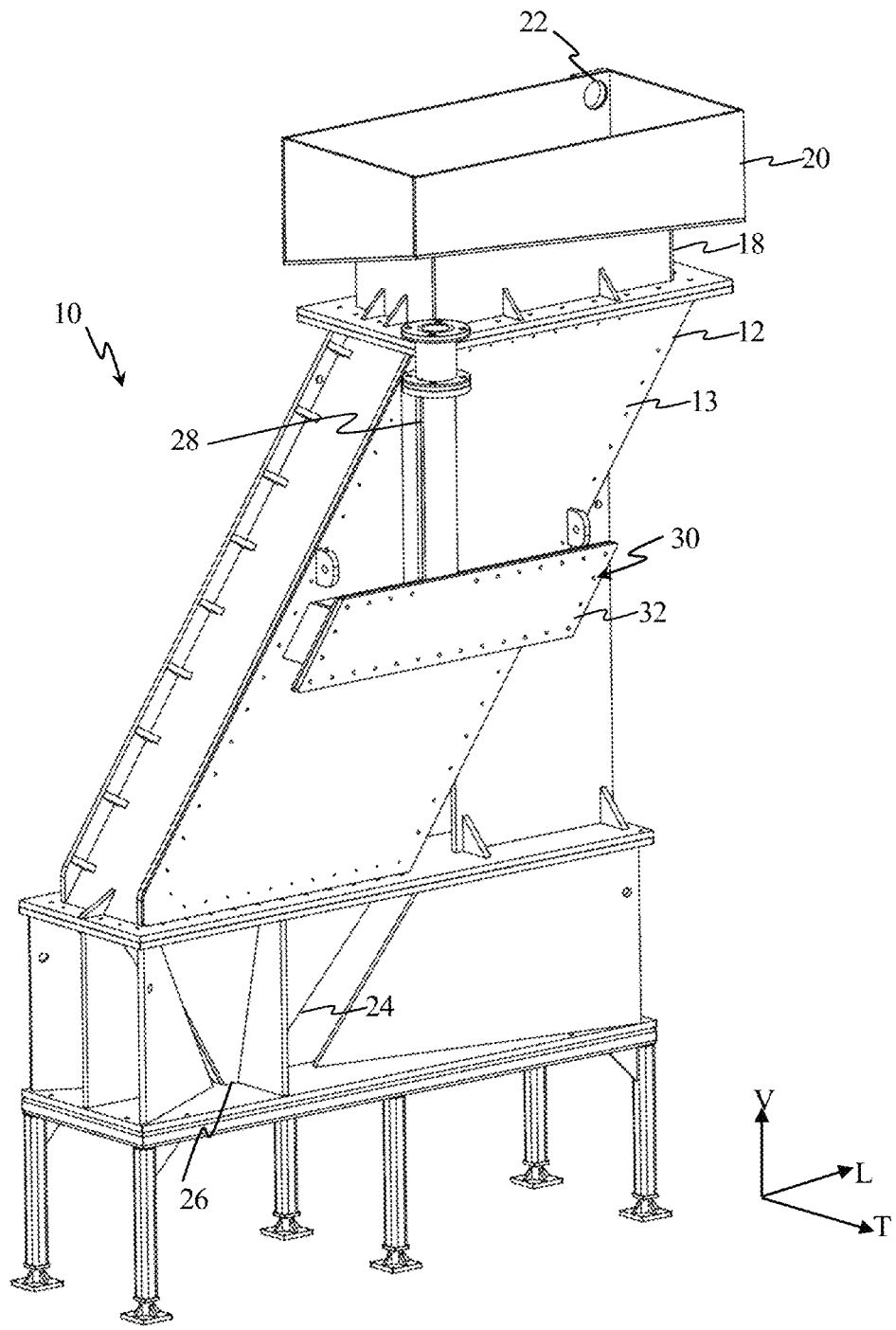
FIG. 1A shows a perspective view of an embodiment of an inclined plate separator including a feedwell of the present invention.
Figure 1B:
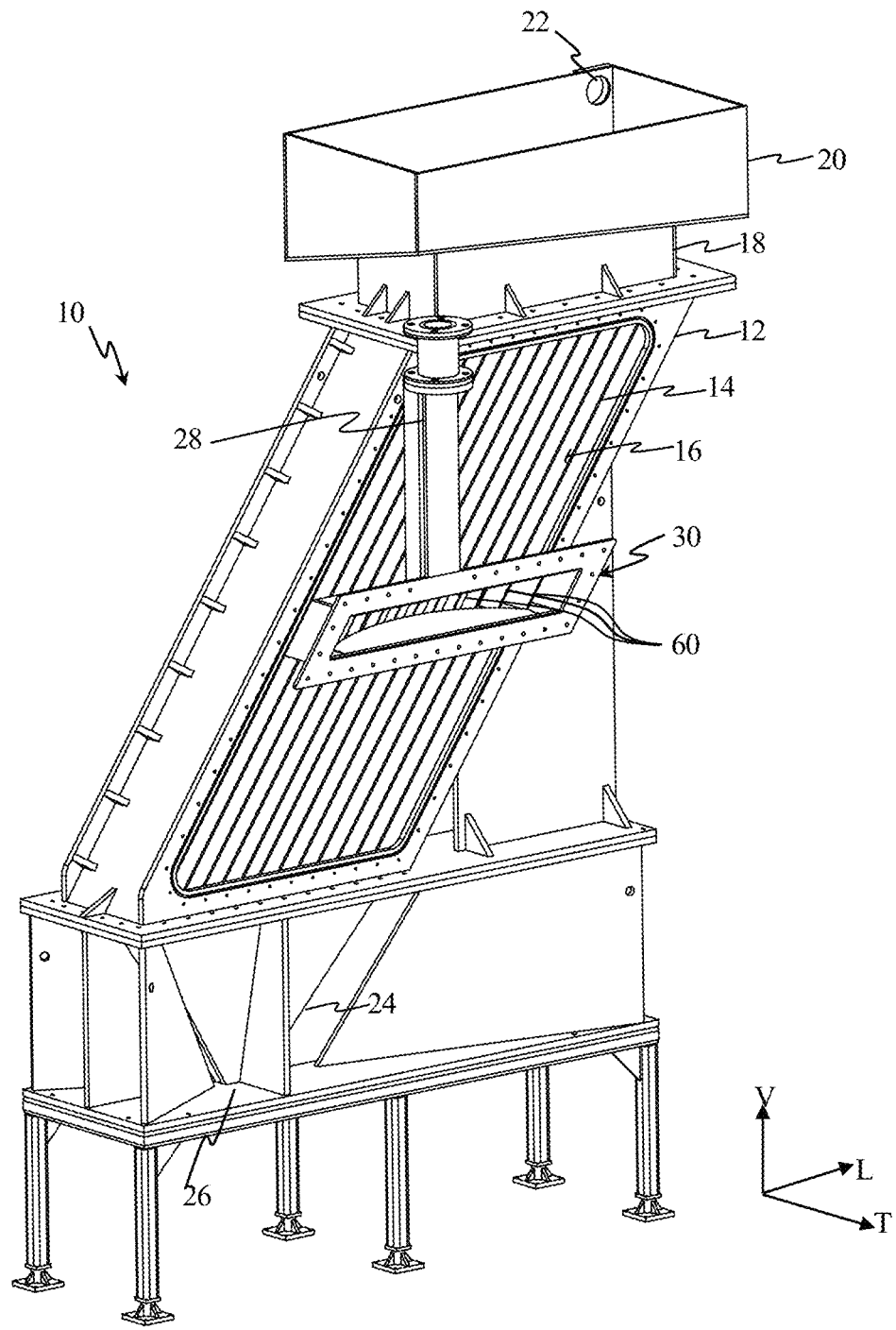
FIG. 1B shows a perspective view of the inclined plate separator of FIG. 1A, with a wall of the separation chamber removed, and an end plate of the feedwell removed.

FIG. 1A shows one embodiment of an inclined plate separator (10) and feedwell (30), in relation to mutually orthogonal axes indicating a vertical direction (V), horizontal lateral direction (L), and horizontal transverse direction (T). FIG. 1B shows the same separator (10) and feedwell (30) with a wall (13) of the separator (10) and an end plate (32) of the feedwell (30) removed to show internal parts.

The separator (10) includes a separation chamber (12) containing a plurality of internal plates (14). The plates (14) extend parallel to each other in the transverse direction (T), and are vertically inclined relative to the lateral direction (L). The plates (14) are spaced apart equidistantly from each other in the lateral direction (L) to define a plurality of separation passages (16) between them. In this embodiment, the separator (10) has eleven plates (14), so as to define a total of twelve separation passages (16), but other embodiments may have a different number of plates (14) and separation passages (16). At their upper ends, the separation passages (16) are in fluid communication with a top plenum (18), which is in fluid communication with a launder channel (20) defining an overflow outlet (22). At their lower ends, the separation passages (16) are in fluid communication with a funnel-shaped bottom plenum (24) defining an underflow outlet (26). An influent fluid from a supply line (28) supplies an influent fluid to the feedwell (30) that distributes the influent fluid among the separation passages (16), as will be further described. As shown in FIGS. 1A and 1B, supply line (28) has a semi-circular cross-section but it is understood that the supply line could also have a circular cross-section or any other geometrical shape.

Inclined Plate Separator: Second Embodiment

FIGS. 2A and 2B show transverse and lateral elevation views of a second embodiment of an inclined plate separator (10). Elements analogous to those in FIGS. 1A and 1B are labelled with like reference numbers. This embodiment of the separator (10) has transversely spaced-apart first and second separation chambers (12a, 12b). Separation chamber (12a) contains inclined plates (14a) defining separation passages (16a). Separation chamber (12b) contains its own set of inclined plates (14) defining their separation passages (16) in an analogous manner. Separation chambers (12a, 12b) are in fluid communication with first and second top plenums (18a, 18b), respectively, and in fluid communication with a single bottom plenum (24) defining underflow the outlet (26). First and second supply lines (28a, 28b) having a circular cross-section supplies influent fluid to first and second feedwells (30a, 30b), respectively, that supply the influent fluid bi-directionally in transverse directions among first and second portions, respectively, of the separation passages (16) in separation chambers (12a, 12b). The second portion of the separation passages (16) is laterally spaced apart from the first portion of the separation passages (16). The separation chambers (12a, 12b) may similarly be equipped with launder channels (20) as shown in FIGS. 1A and 1B.

Inclined Plate Separator: Third Embodiment

Figure 3:
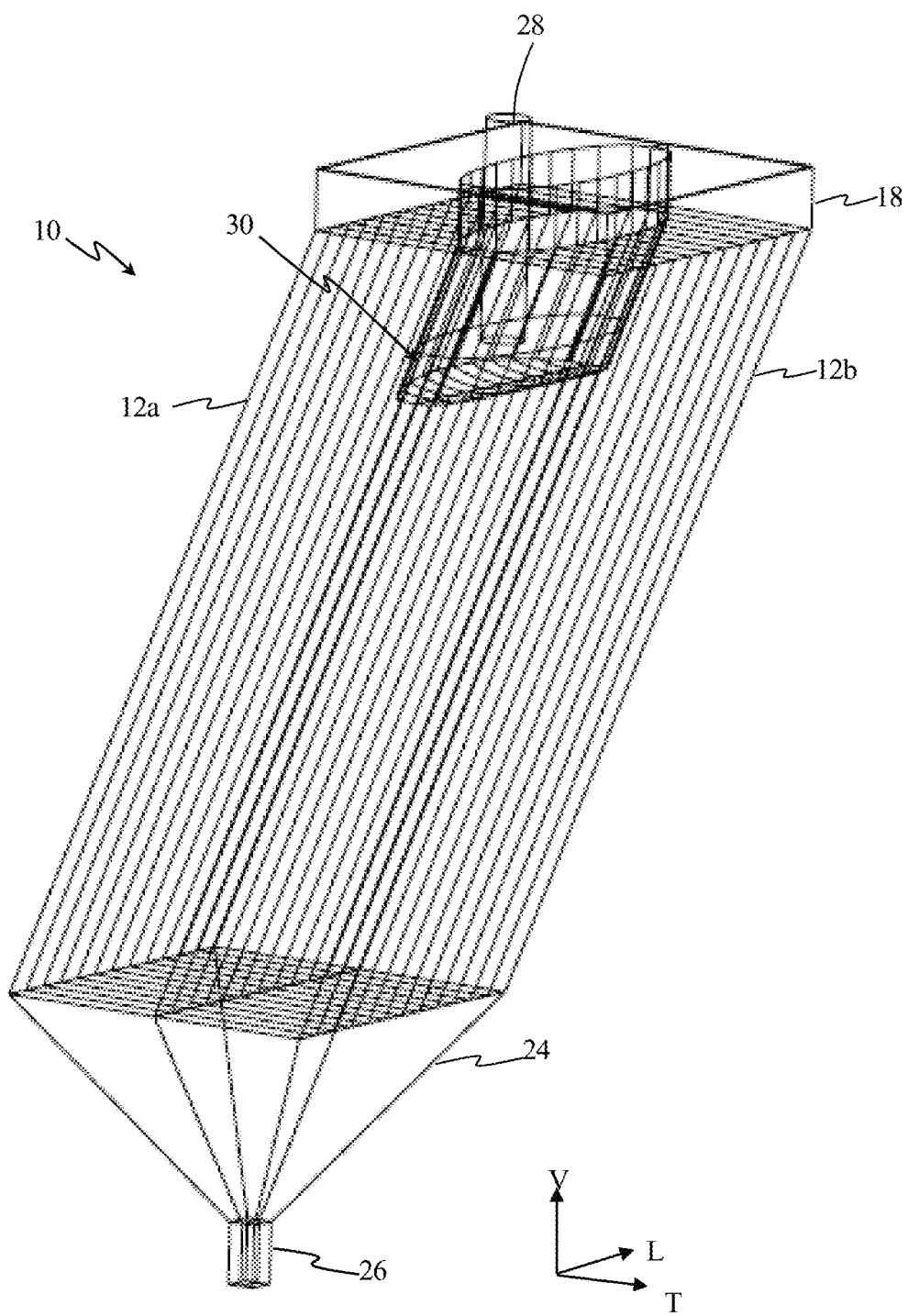
FIG. 3 shows a perspective wireline view of a third embodiment of an inclined plate separator, including a feedwell of the present invention.

FIG. 3 shows a perspective wireline view of a third embodiment of an inclined plate separator (10); elements analogous to those in FIGS. 1A and 1B are labelled with like reference numbers. This embodiment's salient feature may be understood by comparison to the embodiment shown in FIGS. 2A and 2B. In the embodiment shown in FIGS. 2A and 2B, the separation chambers (12a, 12b) are transversely spaced apart, with the feedwells (30a, 30b) disposed between them, so that the feedwells (30a, 30b) are external to the walls that define the separation chambers (12a, 12b). This allows the separation chambers (12a, 12b) to have a constant rectangular shape in the horizontal cross-section along their entire height. In the embodiment shown in FIG. 3, the separation chambers (12a, 12b) abut against each other without separation between them in the transverse direction. The separation chambers (12a, 12b) have a rectangular shape in the horizontal cross-section along most of their height. However, for a portion of the separation chambers (12a, 12b), this rectangular shape is encroached upon by the feedwell (30), so that the feedwell (30) is internal to the walls that define separation chambers (12a, 12b). This allows the overall assembly to have a smaller overall footprint, albeit at the cost of usable volume of the separation chambers (12a, 12b).

Feedwell.

Figure 4A:
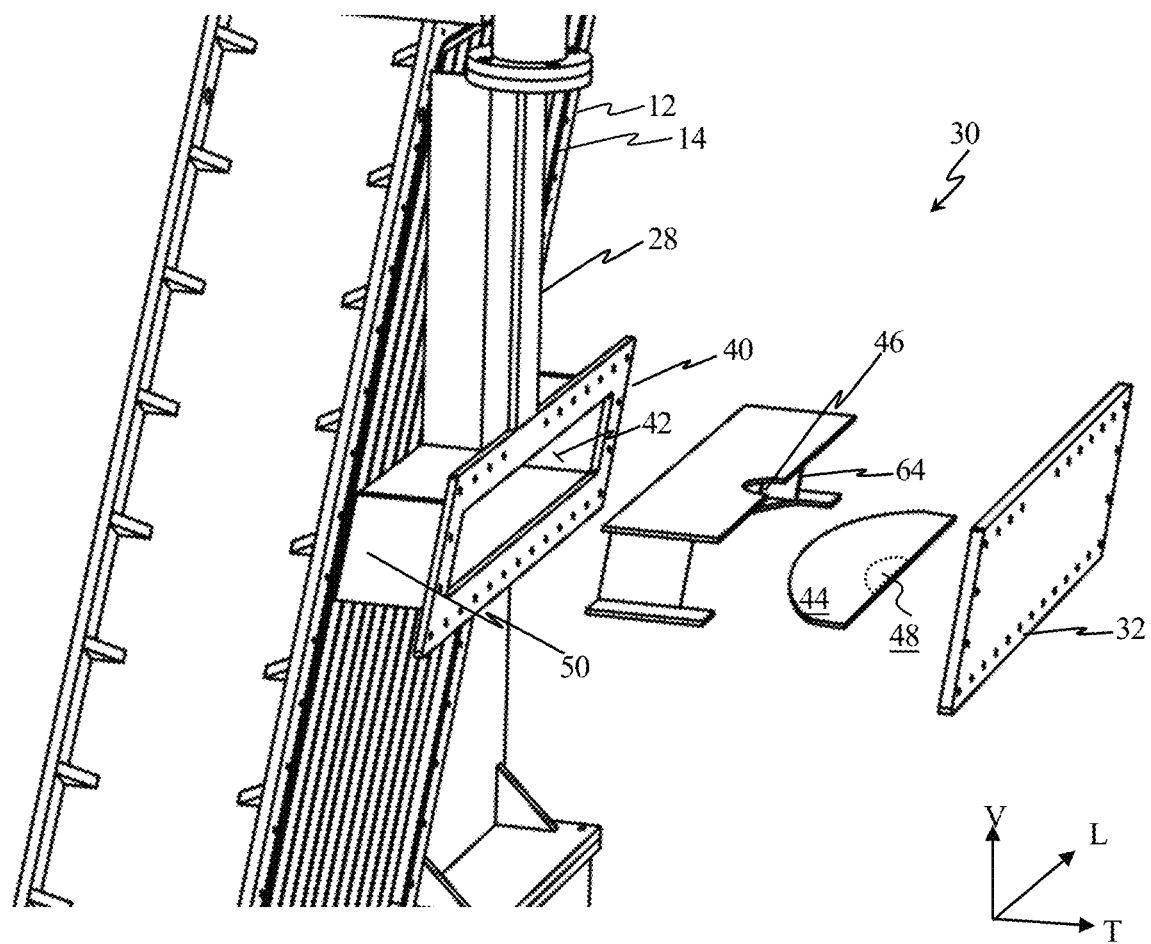
FIG. 4A shows a perspective view of a portion of the inclined plate separator and feedwell of FIGS. 1A and 1B at an enlarged scale, with the feedwell in an exploded (disassembled) state.
Figure 4B:
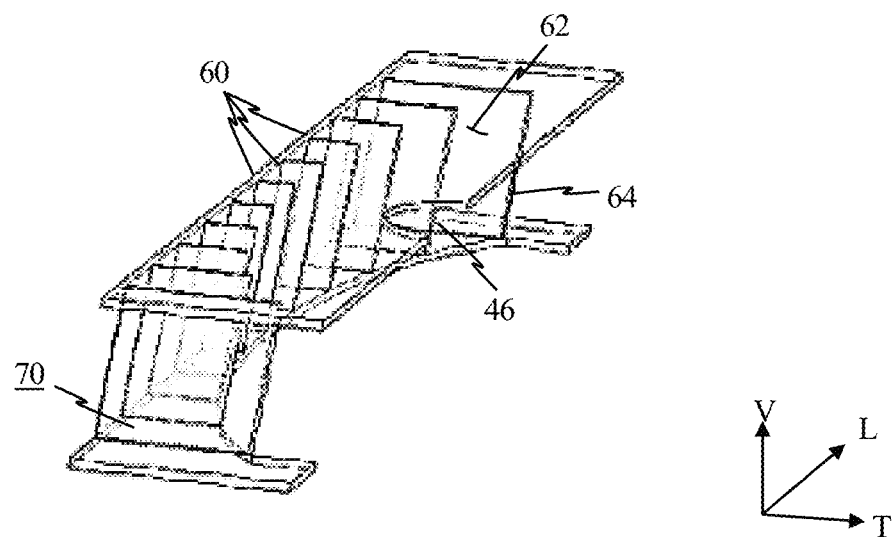
FIG. 4B shows, in transparent form, a perspective view of a subassembly including the fins of the feedwell of FIG. 4A.
Figure 4C:
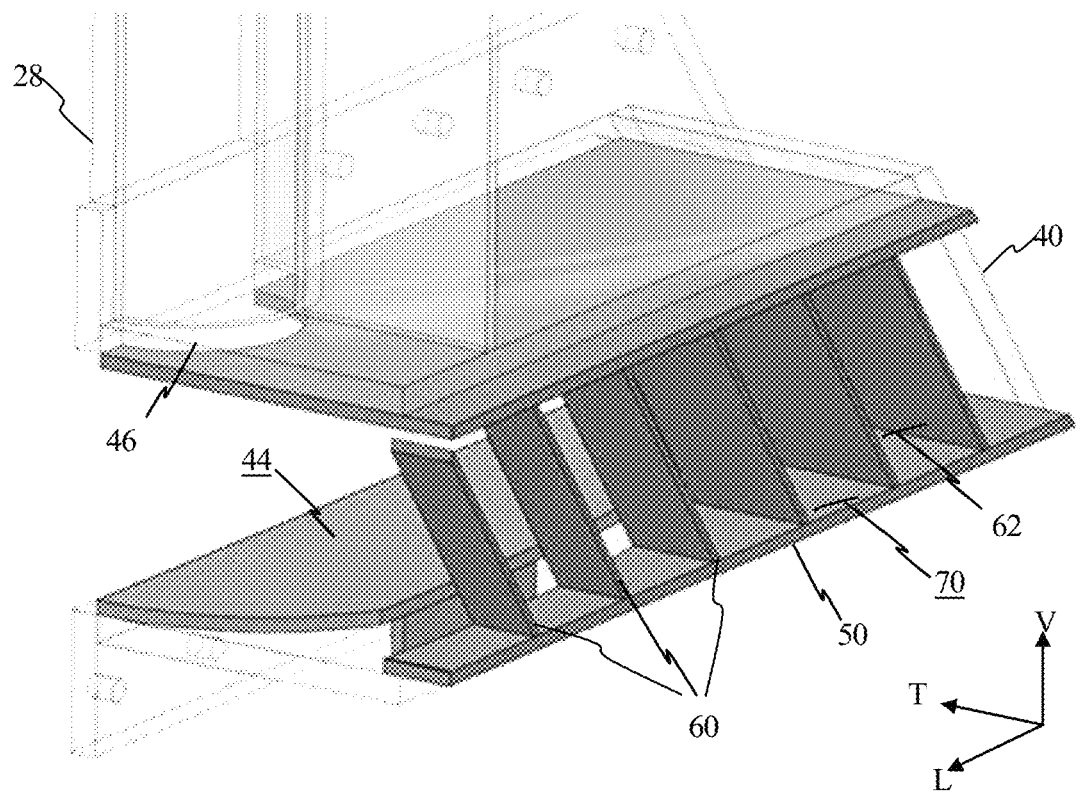
FIG. 4C shows a perspective view of a portion of the feedwell of FIG. 4A.

FIG. 4A shows a portion of the separator (10) of FIG. 1A, with the feedwell (30) in exploded (disassembled) state. FIG. 4B shows a subassembly of the feedwell (30). FIG. 4C shows a portion of the feedwell (30) as viewed from a position proximal to its outlet end rather than its inlet end, as in the case of FIG. 4A. The feedwells (30a, 30b) of the separators (10) of FIGS. 2A-2B and FIG. 3 may be considered to be composed by two such feedwells (30) along a lateral plane of symmetry, without the solid end plate (32). That is, the feedwell (30) of FIG. 4A may be considered to be hydraulically equivalent to half of each feedwell (30a, 30b) in FIGS. 2A-2B or the feedwell (30) of FIG. 3.

The feedwell (30) includes a plenum (40) defining a plenum chamber (42). The term "internal" as used herein in describing a part of the plenum (40) refers to such part being within the plenum chamber (42). The plenum (40) includes an internal upward-facing deflector surface (44), an inlet (46), an outlet (50), and a plurality of internal fins (60) as will be described below.

The inlet (46) directs the influent fluid received from the supply line (28) into the plenum chamber (42) and downwardly onto a receiving region (48) of the deflector surface (44). For example, the inlet is a semi-circular opening formed in a top of plenum (40) which aligns with the semi-circular cut-out (46) in the top plate of the subassembly shown in FIG. 4B. As such, it may be expected that the receiving region (48) of the deflector surface (44) is the portion of the deflector surface (44) immediately below the inlet (46). The deflector surface (44) deflects the flow of influent fluid in horizontal directions radiating from the receiving region (48).

The outlet (50) discharges the influent fluid in the transverse direction (T) from the plenum (40) into the separation chamber (12) of the separator (10). The outlet (50) extends in the lateral direction (L) over a plurality of the internal separation passages of the separator (10).

The fins (60) distribute the influent fluid from the receiving region (48) of the deflector surface (44) to different portions of the outlet (50). Each one of the fins (60) corresponds to a different one of the plates (14) of the separator (10). Accordingly, in like manner as the plates (14), the fins (60) extend parallel to each other in the transverse direction (T). The fins are vertically inclined relative to the lateral direction (L) at the same angle as the plates (14). The fins (60) are laterally spaced-apart equidistantly from each other at the same distance as the lateral spacing between the plates (14) so as to define between them a plurality of internal plenum passages (62), each corresponding to a different one of the separation passages (16) of the separator.

Each of the fins (60) extends in the transverse direction (T) from a proximal end (64) to a fin distal end at the outlet (50). In particular, the fin proximal ends (64) are arranged on a horizontal substantially semi-elliptical path. FIG. 5 shows a top plan view of this arrangement. The center of the semi-elliptical path coincides horizontally with the receiving region (48) of the deflector surface (44). That is, the center horizontally overlaps the receiving region (48). As used herein, the "center" of the semi-elliptical path refers to point corresponding to the center of an elliptical path that would result if the semi-elliptical path were extended to a full elliptical path, symmetric about a vertical plane extending in the lateral direction (L). The major axis of the semi-elliptical path extends in the lateral direction (L). The "major axis" of the semi-elliptical path refers to the axis passing through the foci points of such full elliptical path. The semi-minor axis of the semi-elliptical path extends in the transverse direction (T). The "semi-minor axis" of the semi-elliptical path refers to the axis passing through the center, and perpendicular to the major axis.

FIG. 6 shows, in top plan view, a schematic depiction of the effect of the fins (60) on the flow distribution of influent fluid for a feedwell having a full elliptical deflector surface (44), such as shown in FIG. 3. The inlet (46) directs influent fluent downwardly onto the receiving region (48) of the deflector surface (44). The deflector surface (44) redirects the influent fluid in horizontal directions radiating from the receiving region (48), as shown by notional flow paths (66) (dark gray shaded areas). The fins (60a, 60b) direct the influent fluid into the plenum passages (62a, 62b), each of which communicates via outlet (50a, 50b) with different separation passages (16) of separation chambers (12a, 12b), respectively.

The arrangement of the fin proximal ends (64a, 64b) along the horizontal substantially semi-elliptical paths result in different orientations of inlets (68) of the plenum passages (62a, 62b). The effective width (w) of the inlets (68) is measured between adjacent fin proximal ends (64) in the direction substantially tangential to the semi-elliptical path. The effective widths (w) may be made relatively uniform, by appropriate selection of the eccentricity of the semi-elliptical path. As used herein, "eccentricity" refers to the value, e, as determined in accordance with the below equation, where "a" and "b/2" are the lengths of the major axis and semi-minor axis, of the semi-elliptical path (see FIG. 5). In theory, the eccentricity value may range between zero for a semi-circular elliptical path, and unity for a semi-elliptical path with an infinitesimally small semi-minor axis.

$$e = \sqrt{1 - \left(\frac{b}{a}\right)^2}$$

Figure 7:
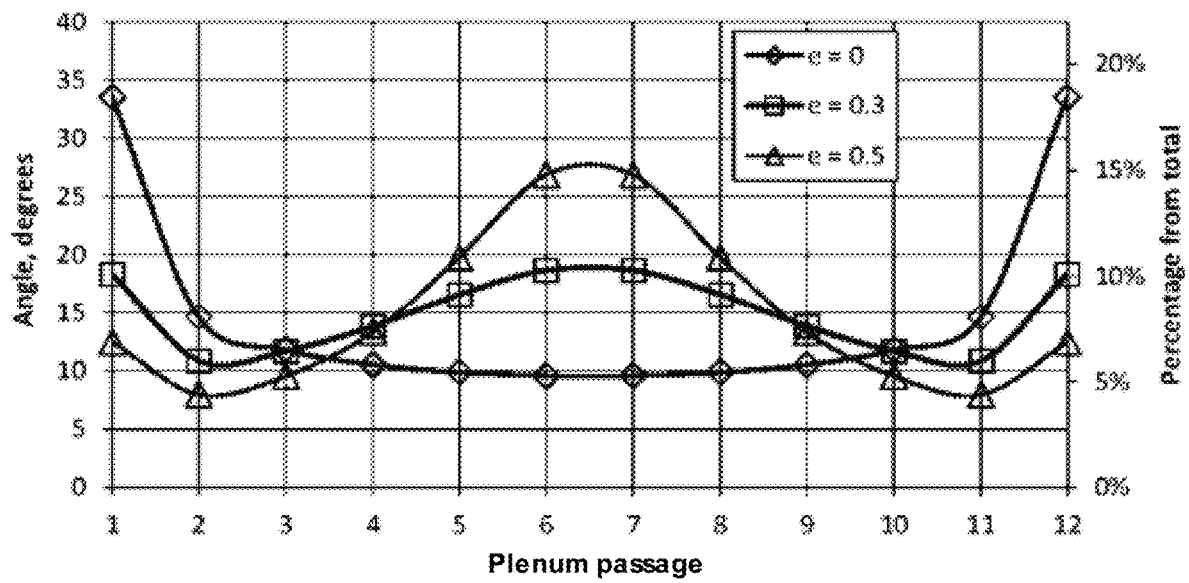
FIG. 7 shows the effect of eccentricity of the semi-elliptical path of the proximal fin ends on the expected flow distribution of the influent fluid among the plenum passages of an embodiment of a feedwell.
Figure 8:
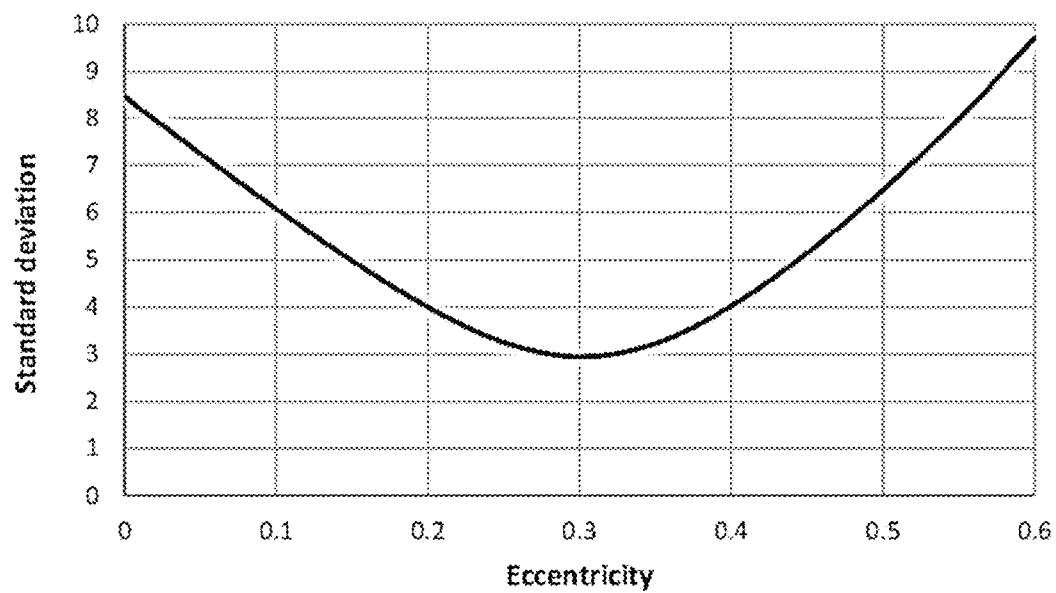
FIG. 8 shows the effect of eccentricity of the semi-elliptical path of the proximal fin ends on the standard deviation of flow distributions of the influent fluid among the plenum passages of an embodiment of a feedwell.

Without restriction to a theory, it is believed that relative uniformity of the effective widths (w) provides for more uniform of distribution of the influent fluid among the plenum passages (62), and hence the separation passages (16) of the separator (10). Based on computation modeling, FIGS. 7 and 8 shows the effect of eccentricity (e) of the semi-elliptical path of the fin proximal ends (64) on the flow distribution of the influent fluid among the plenum passages (62) of the feedwell (FIG. 7), and on the standard deviation on the flow distribution of the influent fluid among the plenum passages (62) (FIG. 8). In the case of a semi-circular elliptical path where e=0, the plenum passages (62) at the ends of the plenum (40) each receive about 18% of the influent fluid flow, while the remainder of the plenum passages (62) receive only between about 5% to 7.5% of the influent fluid flow. In the case of a relatively shallow ellipse where e=0.5, the plenum passages (62) in the lateral vicinity of the receiving region (48) receive about 15% of the influent fluid flow, while plenum passages (62) laterally distal from the receiving region (48) receive as low as about 4% of the influent fluid flow. In the intermediate case of an ellipse where e=0.3, the plenum passages (62) in the lateral vicinity of the receiving region (48) and the plenum passages (62) at the ends of the plenum (40) receive about 10% of the influent fluid flow, with laterally intermediate plenum passages (62) receiving between about 5% to 10% of the influent fluid flow. As apparent from FIGS. 7 and 8, an eccentricity of about 0.3 may be optimal for distributing the influent fluid in a relatively uniform manner among the plenum passages (62). In particular embodiments, the elliptical path may have an eccentricity (e) of between about 0 to about 0.6, more particularly between about 0.1 to about 0.5, more particularly between about 0.2 to about 0.4, and more particularly a value of about 0.3.

In practice, completely uniform flow distribution of the influent fluid to the plenum passages (62) may not be needed to optimize clarification of solids in the separation passages (16). This is because separation passages (16) with higher flows may be associated with lower than average recovery, while separation passages (16) with lower flows may be associated with higher than average recovery, thus compensating for the lower flows to some degree.

Deflector Surface: Concave Curvature.

Figure 9A:
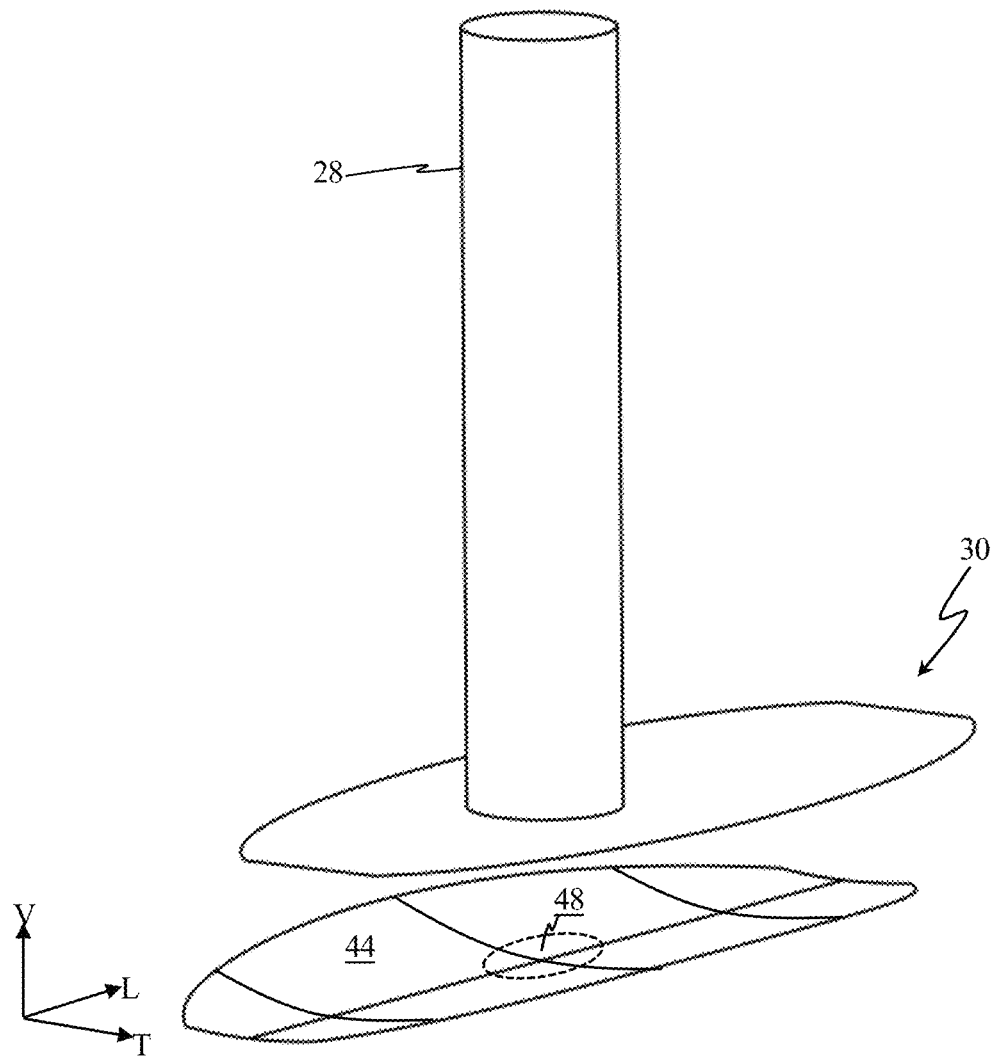
FIG. 9A shows a perspective view of an embodiment of a deflector surface of a feedwell, in relation to a supply line, with the deflector surface being concavely curved in a transverse cross-section.
Figure 9B:
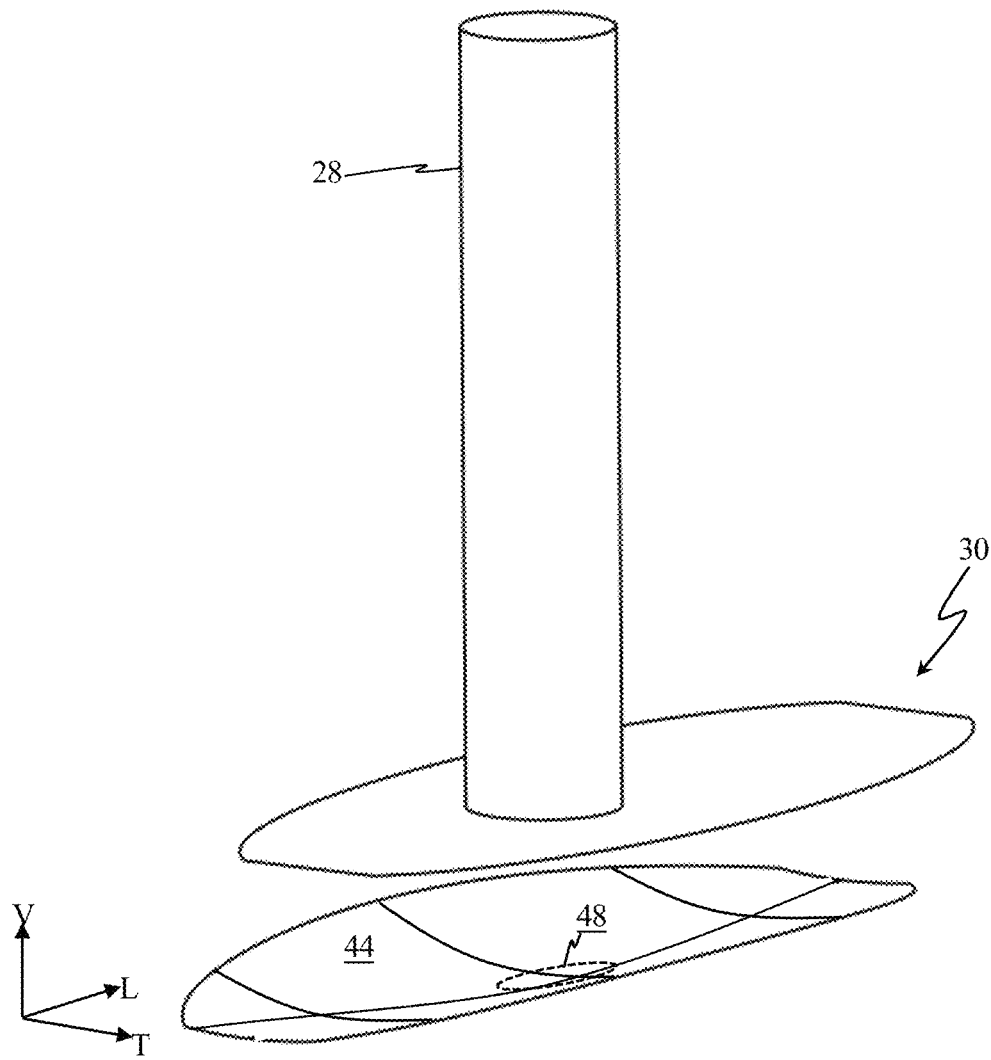
FIG. 9B shows a perspective view of an embodiment of a deflector surface of a feedwell, in relation to a supply line, with the deflector surface being concavely curved in both transverse and longitudinal cross-sections.

In some embodiments, the deflector surface (10) may be flat. In other embodiments, the deflector surface (44) may be concavely curved. FIGS. 9A and 9B show embodiments of a deflector surface (44) of a feedwell (30) in relation to a supply line (28). For clarity, the other parts of the feedwell (30) are not shown in these FIGS. 9A and 9B, with it being understood that the relationship of the deflector surface (44) to the other parts of the feedwell (30) is analogous to that previously described.

In the embodiment of FIG. 9A, the deflector surface (44) is concavely curved in a transverse cross-section; in the embodiment of FIG. 9B, the deflector surface (44) is also concavely curved in the lateral cross-section. In these embodiments, the concave deflector surface (44) corresponds to an inner cylindrical surface, but in other embodiments the concave deflector surface (44) may be non-cylindrical.

By virtue of the concave curvature in the transverse cross-section, and the arrangement of the fin proximal ends (64) along the substantially semi-elliptical path, influent fluid will flow upward a greater vertical distance from the receiving region (48) to plenum passages (62) that are laterally proximal to the receiving region (48), in comparison to plenum passages (62) that are laterally distal from the receiving region (48). This differential hydraulic resistance between the different lateral locations may be exploited to decrease the amount of the influent fluid that flows to the plenum passages (62) that are laterally proximal to the receiving region (48). This may offset the phenomenon of higher stagnation pressure near the lateral center of the deflector surface (44), which tends to drive more influent fluid to the plenum passages (62) that are laterally proximal to the receiving region (48) (e.g., see FIG. 7, for plenum passages no. 6 and 7, for e=0.5).

Deflector Surface: Fin Extensions.

Figure 10A:
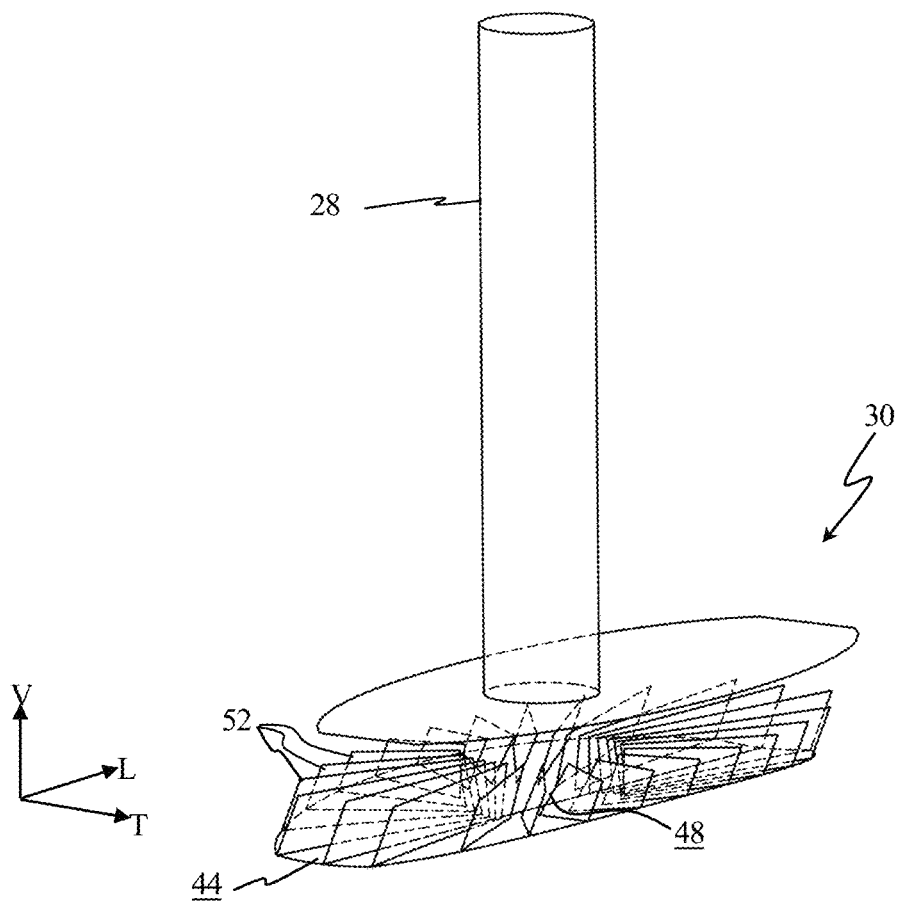
FIG. 10A shows a perspective view of an embodiment of a deflector surface of a feedwell, in the relation to a supply line, with the deflector surface having fin extensions thereon.
Figure 10B:
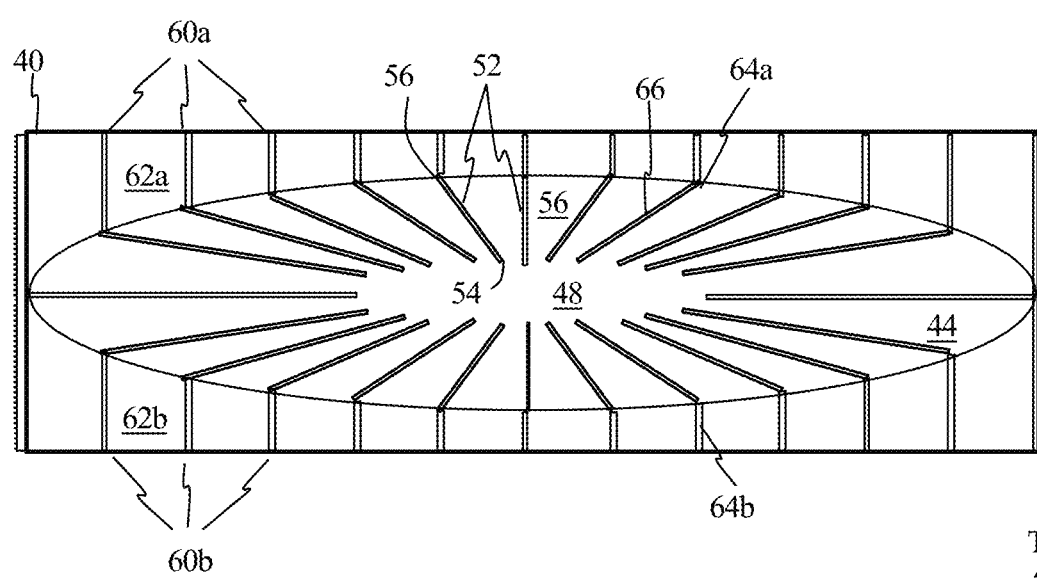
FIG. 10B shows a top plan view of the fin extensions and deflector surface of FIG. 10A.

FIGS. 10A and 10B show an embodiment of a deflector surface (44) of a feedwell (30) in relation to a supply line (28). For clarity, the other parts of the feedwell (30) are omitted, with it being understood that the deflector surface (44) relates to the other parts of the feedwell (30) in a manner analogous that previously described.

In this embodiment, the feedwell (30) has fin extensions (52) that extend vertically upward from the deflector surface (44), and extend horizontally outward from the receiving region (48). Each fin extension (52) extends horizontally from a fin extension proximal end (54) at the receiving region (48) to a fin extension distal end (56) abutting a different one of the fin proximal ends (64). Accordingly, the fin extensions (52) define between themselves deflector passages (56) that extend the plenum passages (64) horizontally towards the receiving region (48). The deflector passages (54) may be used to help effect a desired distribution of the influent fluid to plenum passages (64).

Plenum Lower Internal Surface.

In the embodiment shown in FIG. 4C, the plenum (40) is defined in part by a lower internal surface (70). In this embodiment, the surface (70) is disposed only slightly below, but at substantially the same elevation as the edge of the deflector surface (44). Although not necessarily continuous with the deflector surface (44), the surface (70) extends horizontally from the edge of the deflector surface (70). Further, the fins (60) extend horizontally to the outlet (50) of the plenum (40). This configuration of the plenum (40) directs the influent fluid substantially in a horizontal direction as it flows out of the plenum (40) and into the separation chamber (12).

Figure 11A:
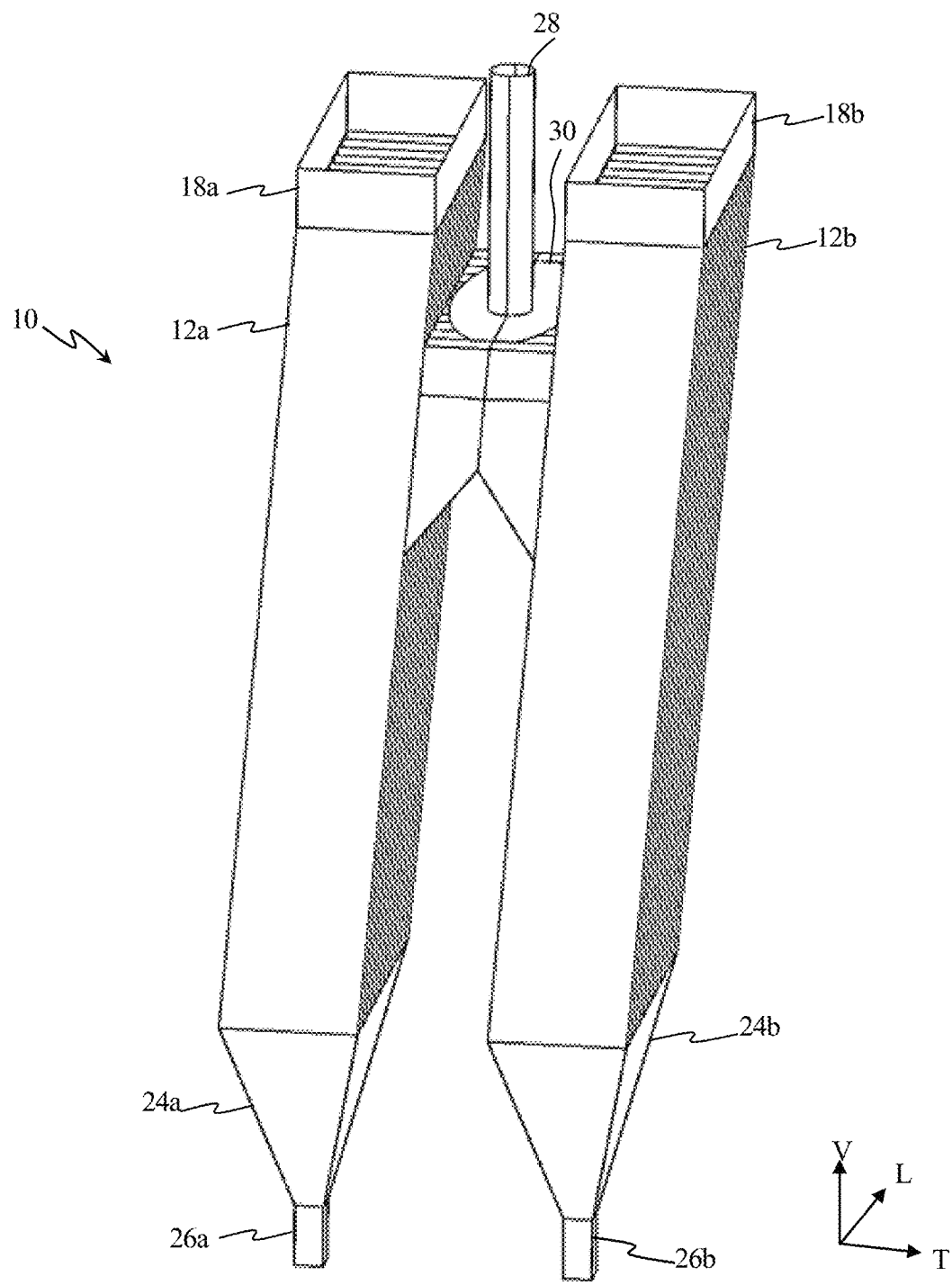
FIG. 11A shows a fourth embodiment of an inclined plate separator including a feedwell of the present invention, having a plenum with an inclined lower internal surface.
Figure 11B:
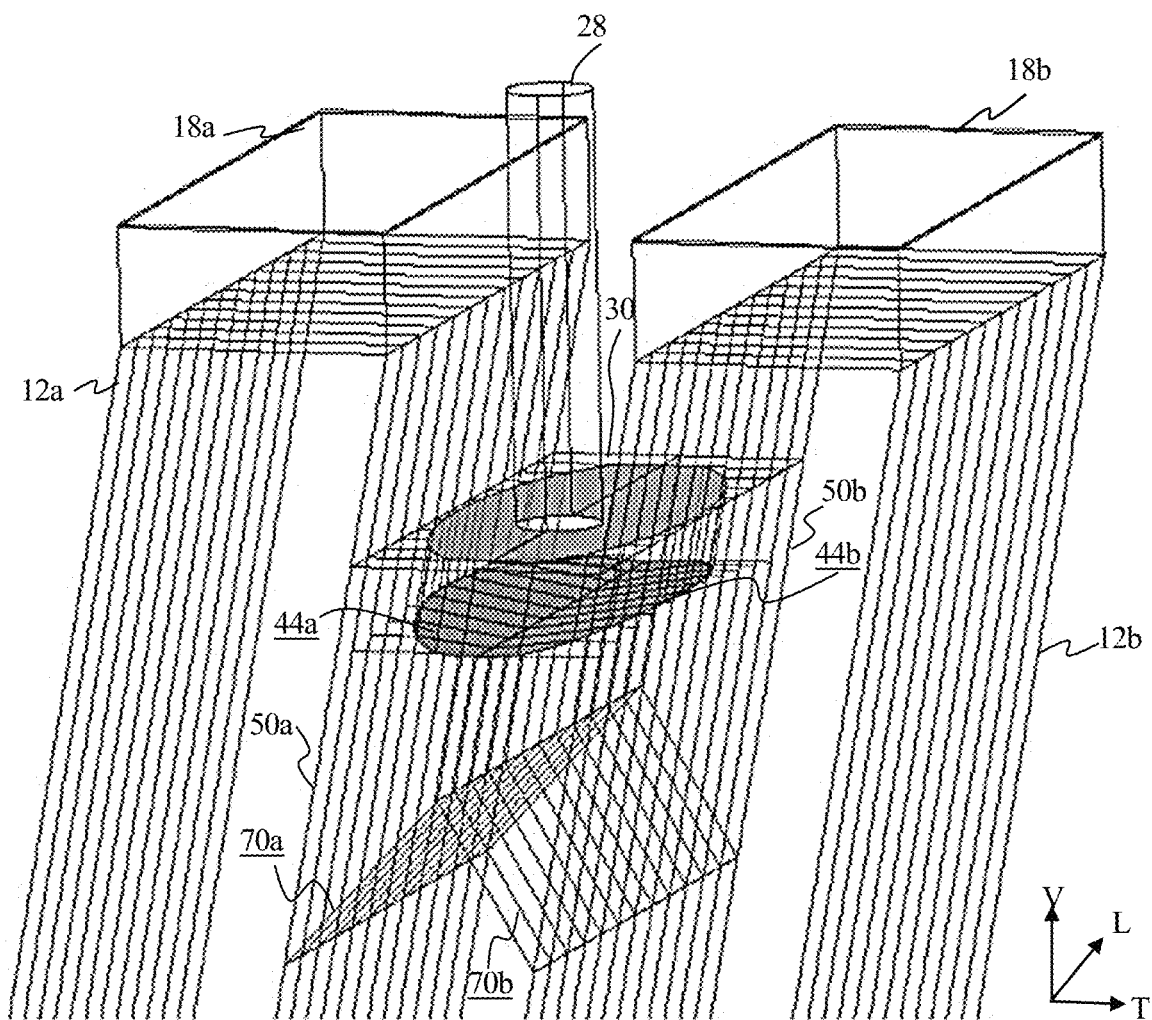
FIG. 11B shows a wireline view of a portion of the inclined plate separator and the feedwell of FIG. 11A.

FIG. 11A shows another embodiment of a separator (10) with a feedwell (30) having a different configuration of the plenum (40). FIG. 11B shows a wireline view of a portion of this separator (10) and feedwell (30). In contrast to the embodiment of FIG. 4C, the plenums are defined by lower internal surfaces (70a, 70b) that are at elevations substantially below the edge of the deflector surface. Further, the lower internal surfaces (70a, 70b) are upwardly facing, but are downwardly inclined relative the horizontal transverse direction (T) as they extend horizontally to the outlet (50) of the plenum (40). In use, the influent fluid flows from the supply line (28) downwardly onto the receiving portion (48) of the deflector surface (44) and is deflected toward the edges of the deflector surface (44). The influent fluid then spills over the edges of the deflector surface (44) and downwardly onto the lower internal surfaces (70a, 70b). In comparison to the relatively vertically constrained outlet (50) in the embodiment shown in FIG. 4C, this configuration allows the outlets (50a, 50b) to have a greater vertical depth, which may permit a more uniform flow of the influent fluid into the separation passages (16) of the separator (10). In other embodiments, the deflector surface (44) may be flush with lower internal surfaces (70a, 70b).

Use and Operation Inclined Plate Separator and Feedwell.

The feedwell (30) and separator (10) assembly is used to clarify an influent fluid containing solids, such as an oil sands slurry comprising water mixed with aerated bitumen, process aids (e.g., sodium hydroxide and/or others), and fine solids in the form of sand and clay particles. The feedwell (30) supplies and distributes the influent fluid among the separation passages (16). Within each of the separation passages (16), the solids (e.g., sand and clay particles) settle on the upper surface of the lower one of the plates (14) defining the separation passages (16), and slide downward to the bottom plenum (24). The clarified influent fluid (e.g., water, process aids, and aerated bitumen) flows upward along the separation passages (16), through the top plenum (18), into the launder channel (20), and exits via the overflow outlet (22) via an overflow line (not shown). An underflow fluid including the settled solids flows through the underflow outlet (26) to an underflow line including a pump (not shown).

Interpretation.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The claimed invention is:

1. A feedwell for supplying an influent fluid to an inclined plate separator comprising a separation chamber containing a plurality of internal plates extending parallel to each other in a horizontal transverse direction, vertically inclined relative to a horizontal lateral direction perpendicular to the transverse direction, and spaced apart equidistantly from each other in the lateral direction to define therebetween a plurality of internal separation passages of the separator, the feedwell comprising a plenum comprising:
   (a) an internal upward-facing deflector surface;
   (b) an inlet for directing the influent fluid into the chamber and downwardly on to a receiving region of the deflector surface;
   (c) an outlet for discharging the influent fluid in the transverse direction from the plenum into the separation chamber of the separator, wherein the outlet extends in the lateral direction over the plurality of internal separation passages of the separator; and
   (d) a plurality of internal fins extending parallel to each other in the transverse direction, vertically inclined relative to the lateral direction, and spaced apart equidistantly from each other in the lateral direction to define therebetween a plurality of internal plenum passages each corresponding to a different one of the separation passages of the separator, wherein each of the fins extends in the transverse direction from a fin proximal end to a fin distal end at the outlet, wherein the fin proximal ends are arranged on a horizontal semi-elliptical path having a center coinciding horizontally with the receiving region of the deflector surface, a major axis extending in the lateral direction, and a semi-minor axis extending in the transverse direction.

2. The feedwell of claim 1, wherein the semi-elliptical path has an eccentricity (e) between 0.1 to about 0.5, wherein the eccentricity is defined by a length (a) of the major axis, and a length (b/2) of the semi-minor axis, in accordance with a relationship:

$$e = \sqrt{1 - \left(\frac{b}{a}\right)^2}.$$

3. The feedwell of claim 2, wherein the eccentricity is between about 0.2 to about 0.4.

4. The feedwell of claim 3, wherein the eccentricity is about 0.3.

5. The feedwell of claim 1, wherein the deflector surface is contoured, such that the elevation of the deflector surface increases in the transverse direction from the receiving region to the fin proximal ends.

6. The feedwell of claim 1, wherein the plenum further comprises a plurality of internal fin extensions, wherein each fin extension extends upwardly from the deflector surface, and extends horizontally from a fin extension proximal end at the receiving region to a fin extension distal end abutting a corresponding one of the fin proximal ends.

7. The feedwell of claim 1, wherein the plenum is defined in part by an upward facing, lower internal surface disposed below the deflector surface to receive influent fluid flowing off an edge of the deflector surface, and inclined downwardly toward the outlet.

8. The feedwell of claim 1, wherein the plenum is external to walls that define the separation chamber.

9. The feedwell of claim 1, wherein the plenum is internal to walls that define the separation chamber.

10. The feedwell of claim 1, wherein the inclined plate separator comprises two separation chambers, a first separation chamber and a second separation chamber, the first and second separation chambers either abutting one another or being spaced apart in the transverse direction from one another, the first and second separation chamber each containing a plurality of internal plates extending parallel to each other in the transverse direction, vertically inclined relative to the lateral direction, and spaced apart equidistantly from each other in the lateral direction, wherein the plenum further comprises:
   (a) a second outlet, spaced apart from the outlet in the transverse direction, and for discharging the influent fluid in the transverse direction from the plenum into the second separation chamber, wherein the second outlet extends in the lateral direction over the second plurality of internal separation passages of the second separation chamber; and
   (b) a second plurality of internal fins, spaced apart from the plurality of fins in the transverse direction, extending parallel to each other in the transverse direction, vertically inclined relative to the lateral direction, and spaced apart equidistantly from each other in the lateral direction to define therebetween a second plurality of internal plenum passages each corresponding to a different one of the second separation passages of the second separation chamber, wherein each of the second fins extends in the transverse direction from a second fin proximal end to a second fin distal end at the second outlet, wherein the second fin proximal ends are arranged on a second horizontal semi-elliptical path having a second center coinciding horizontally with the receiving region of the deflector surface, a second major axis extending in the lateral direction, and a second semi-minor axis extending in the transverse direction.

11. The feedwell of claim 1, wherein the plenum is positioned adjacent to the internal plates of the inclined plate separator such that upper portions of the internal plates extend above the plenum and lower portions of the internal plates extend below the plenum.

\* \* \* \* \*